(12) United States Patent
Pulickal Aravindakshan et al.

(10) Patent No.: US 12,443,557 B2
(45) Date of Patent: Oct. 14, 2025

(54) RESERVATION OF PCIe SLOTS FOR MANAGEMENT BY A RAID DRIVER

(71) Applicant: Microchip Technology Incorporated, Chandler, AZ (US)

(72) Inventors: Anoop Pulickal Aravindakshan, Karnataka (IN); Viswas G, Kerala (IN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/527,579

(22) Filed: Dec. 4, 2023

(65) Prior Publication Data

US 2025/0077463 A1 Mar. 6, 2025

(30) Foreign Application Priority Data

Aug. 30, 2023 (IN) .............................. 202311058258

(51) Int. Cl.
*G06F 13/42* (2006.01)
*G06F 3/06* (2006.01)

(52) U.S. Cl.
CPC .......... *G06F 13/4282* (2013.01); *G06F 3/061* (2013.01); *G06F 3/0629* (2013.01); *G06F 3/0689* (2013.01); *G06F 2213/0026* (2013.01)

(58) Field of Classification Search
CPC ...... G06F 3/061; G06F 3/0604; G06F 3/0629; G06F 3/0632; G06F 3/0689; G06F 13/4282; G06F 2213/0026
See application file for complete search history.

(56) References Cited

U.S. PATENT DOCUMENTS

| | | | |
|---|---|---|---|
| 2006/0129758 A1 | 6/2006 | Trunck et al. | ................. 711/114 |
| 2017/0293448 A1 | 10/2017 | Bolen et al. | |
| 2018/0059982 A1* | 3/2018 | Balakrishnan | ........ G06F 3/0632 |
| 2019/0332276 A1* | 10/2019 | Gupta | .................. G06F 3/0655 |
| 2021/0157761 A1 | 5/2021 | Bolen et al. | |

OTHER PUBLICATIONS

International Search Report and Written Opinion, Application No. PCT/US2024/017862, 15 pages, Jun. 6, 2024.

* cited by examiner

*Primary Examiner* — Ernest Unelus
(74) *Attorney, Agent, or Firm* — SLAYDEN GRUBERT BEARD PLLC

(57) ABSTRACT

A system and method including a PCIe slot, a storage device coupled to the PCIe slot, and a host server including a processor and a non-transitory memory including machine-readable instructions that, when executed by a processor, cause the processor to: load a RAID driver; receive, by the RAID driver, a probe call identifying the PCIe slot; determine, based on a slot reservation table stored in a non-volatile RAM accessible by the RAID driver, whether the storage device coupled to the PCIe slot is managed by the RAID driver; send, when the PCIe slot is identified in the slot reservation table, a response indicating that the RAID driver will control access to the storage device coupled to the PCIe slot; and send, when the PCIe slot is not identified in the slot reservation table, a response indicating that the RAID driver will not control access to the storage device.

20 Claims, 4 Drawing Sheets

```
structure NVME_device_slot_list {
    uint16_t    Segment;     //PCI Segment num
    uint8_t     Bus;         //PCI bus
    uint8_t     Device;      //PCI device
    uint8_t     Fun;         //PCI fun
    uint16_t    Slot_num;    //PCI drive slot
};

struct NVRM_SA_info {
    uint16_t    RevVer;           // Structure revision version
    efi_guid_t  Sys_guid;         // UUID of the system
    uint8_t     Device_count;     // Total device count
    struct NVME_device_slot_list Device_list [32];  // NVME Max drives list (supports upto 32)
    uint8_t     Ctrl_UUID [32];   // Ctrl UUID, Considering for current lenovo size, for future use
    uint16_t    Ctrl_Poi_slot;    // Controller PCI slot number, For future use
    uint8_t     resvd {31};       // Future use
    uint32_t    Crc;              // CRC of the structure
};
```

FIG. 4

RESERVATION OF PCIe SLOTS FOR MANAGEMENT BY A RAID DRIVER

PRIORITY

This application claims priority to Indian Provisional Patent Application No. 202311058258, filed Aug. 30, 2023, the contents of which are hereby incorporated in their entirety.

TECHNICAL FIELD

The present disclosure relates to reserving a peripheral component interconnect express (PCIe) drive slot for use of a host redundant array of independent disks (RAID) stack, in particular, a RAID driver to manage the storage devices connected to assigned PCIe slots.

BACKGROUND

A Peripheral Component Interconnect Express (PCIe) is a high-speed serial computer expansion bus standard that replaces the older PCI, PCI-X, and AGP bus standards. A PCIe root complex is the root of a hierarchy that connects with the central processing unit (CPU) and memory. A PCIe end point or switch does not connect with the CPU or memory, but rather connects through the root complex sub-system. PCIe uses point-to-point topology, with separate serial links connecting every device to the root complex subsystem, which root complex subsystem may be considered a host, allowing for faster communication between devices. Motherboards and systems that support PCIe use PCIe devices of different sizes, such as ×1, ×4, ×8, or ×16, which refers to the number of lanes they use. PCIe devices connect to the motherboard or system using a PCIe slot so the device may be recognized by the motherboard or system.

Non-volatile memory express (NVMe) is an open, logical-device interface specification for accessing a computer's non-volatile storage media usually coupled via the PCIe bus. The NVMe may be a NAND flash memory that comes in PCIe add-in cards.

Redundant array of independent disks (RAID) is a data storage virtualization technology that combines multiple physical disk drive components into one or more logical units for the purposes of data redundancy, performance improvement, or both. The disks in the RAID may be connected to the central processing unit (CPU) using a PCIe slot. Traditionally, a software (SW) redundant array of independent disks (RAID) stack running on a host CPU is managed above the operating system block input/output (I/O) layer using the operating system block functionalities for disk I/O, for example using Linux Software RAID (often called mdraid or MD/RAID). Alternatively, the drives may be assigned to a driver, e.g., a RAID stack, using udev rules. However, this udev rule-based approach has limitations in PCIe slot binding when a failed disk is replaced with a new disk and when loading an operating system from a logical drive. For example, when a drive fails and is replaced, the udev rule-based approach will not work, since the driver must be tied to the drive, and this does not automatically occur. Additionally, support for the udev rule-based approach is limited before the operating system is booted.

The CPU may have any number of PCIe slots and the user may wish to only assign a subset of the PCIe slots to be managed as part of the RAID and managed by a RAID driver. However, there is no standard method for reserving a PCIe slot for control by a RAID driver. Thus, there is a need for methods and systems for reserving PCIe drive slots for management by a RAID driver.

SUMMARY OF THE INVENTION

Examples of the present disclosure provide systems and methods for reserving PCIe slots for management by a RAID driver. A system includes a peripheral component interconnect express (PCIe) slot, a storage device coupled to the PCIe slot, and a host server coupled to the PCIe slot. The host server includes a processor and a non-transitory memory including machine-readable instructions that, when executed by a processor, cause the processor to: load a redundant array of independent disks (RAID) driver; receive, by the RAID driver, a probe call identifying the PCIe slot; determine, based on a slot reservation table stored in a non-volatile RAM accessible by the RAID driver, whether the storage device coupled to the PCIe slot is managed by the RAID driver; send, when the PCIe slot is identified in the slot reservation table, a response indicating that the RAID driver will control access to the storage device coupled to the PCIe slot; and send, when the PCIe slot is not identified in the slot reservation table, a response indicating that the RAID driver will not control access to the storage device.

A method including loading a redundant array of independent disks (RAID) driver; receiving, by the RAID driver, a probe call identifying a peripheral component interconnect express (PCIe) slot; determining, based on a slot reservation table stored in a non-volatile RAM accessible by the RAID driver, whether a storage device coupled to the PCIe slot is managed by the RAID driver; sending, when the PCIe slot is identified in the slot reservation table, a response indicating that the RAID driver will control access to the storage device coupled to the PCIe slot; and sending, when the PCIe slot is not identified in the slot reservation table, a response indicating that the RAID driver will not control access to the storage device.

An article of manufacture including a non-transitory memory including machine-readable instructions that, when executed by a processor, cause the processor to: load a redundant array of independent disks (RAID) driver; receive, by the RAID driver, a probe call identifying a peripheral component interconnect express (PCIe) slot; determine, based on a slot reservation table stored in a non-volatile RAM accessible by the RAID driver, whether a storage device coupled to the PCIe slot is managed by the RAID driver; send, when the PCIe slot is identified in the slot reservation table, a response indicating that the RAID driver will control access to the storage device coupled to the PCIe slot; and send, when the PCIe slot is not identified in the slot reservation table, a response indicating that the RAID driver will not control access to the storage device.

BRIEF DESCRIPTION OF THE DRAWINGS

Example aspects of the present disclosure are described below in conjunction with the figures, in which:

FIG. 4 illustrates an example structure for an NVRAM slot reservation table.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1:
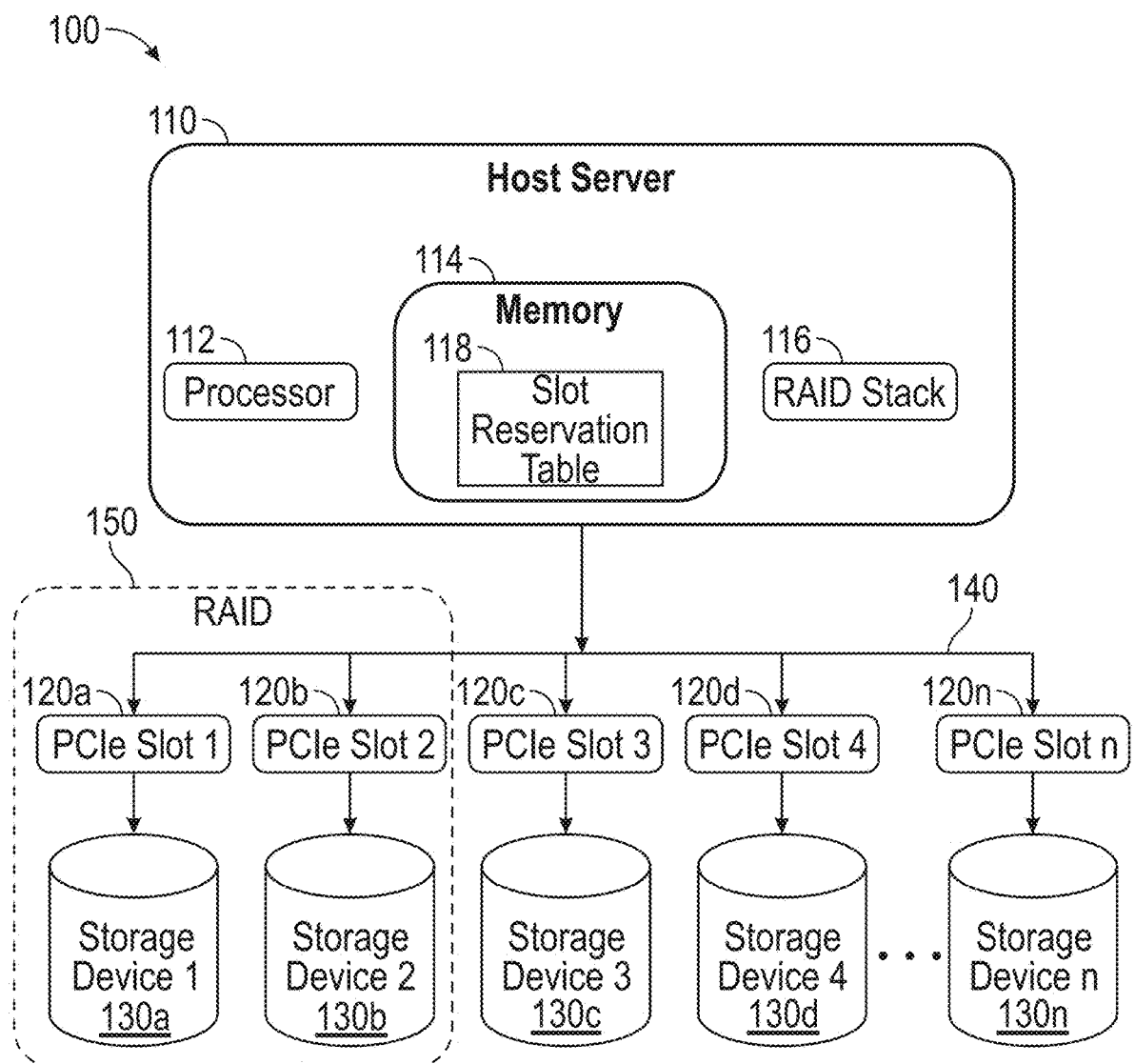
FIG. 1 is a block diagram of an example system including a RAID.

FIG. 1 is a block diagram of an example system including a RAID. Device 100 includes host server 110, PCIe slots 1 through n, designated respectively as 120a through 120n, storage devices 1 through n, designated respectively as 130a through 130n, and memory bus 140. Device 100 illustrated in FIG. 1 is shown as having five storage devices, but this is not intended to be limiting. Other examples may include more than five storage devices or may include fewer than five storage devices.

Host server 110 may include processor 112, memory 114, and RAID stack 116. Processor 112 may be coupled to memory 114. Processor 112 may write data to processor memory 114 and may read data from processor memory 114. Memory 114 may be a non-transitory memory, such as non-volatile random-access memory (NVRAM), including machine-readable instructions that when executed by processor 112, may cause processor 112 to perform one or more actions as described herein. Processor 112 may be a central processing unit (CPU) or other processing device. Processor 112 may drive signals onto memory bus 140 to read data from storage devices 130 and may drive signals onto memory bus 140 to write data to storage devices 130. Memory bus 140 may receive data from processor 112 and may transmit data to one or more circuits coupled to memory bus 140.

PCIe slots 120a-120n may be coupled to memory bus 140 and allow connection between storage devices 130a-130n and processor 112. Memory bus 140 may be a Peripheral Component Interconnect Express (PCIe) bus or another bus type not specifically mentioned. Storage devices 130a-130n may, respectively, be non-transitory storage devices, such as solid state drives or hard disk drives, including but not limited to Dynamic Random Access Memory (DRAM), Non-Volatile Memory (NVM), Embedded Non-Volatile Memory (eNVM), Non-Volatile Memory Express (NVMe), or another type of non-transitory storage not specifically mentioned. Storage devices 130a-130n may, respectively, include a circuit to move data to and from the storage device. Storage devices 130a-130n may use open, logical-device interface specifications for accessing non-volatile storage media, wherein the specifications may include NVMe or non-volatile memory host controller interface specification (NVMHCIS). Memory bus 140 may facilitate data transmission to and from storage devices 130a-130n. Processor 112 may move data through memory bus 140 to storage devices 130a-130n, and processor 112 may receive data from storage devices 130a-130n through memory bus 140.

In some examples, only a subset of storage devices 130 are configured as part of a RAID 150 while other storage devices 130 are not part of RAID 150. For example, storage devices 130a and 130b are part of RAID 150 while storage devices 130c through 130n are not. In this configuration, PCIe slots 120a and 120b to which storage devices 130a and 130b are coupled are reserved for use by RAID 150 and access to storage devices 130a and 130b coupled to reserved PCIe slots 130a and 130b is controlled by a RAID driver while access to the remaining storage devices 130c through 130n, coupled to unreserved PCIe slots 120c through 120n, is controlled by another driver, e.g. a native NVMe driver, in an operating system running on host server 110. RAID 150 also includes RAID stack 116 in host server 110, described in more detail below.

Figure 2:
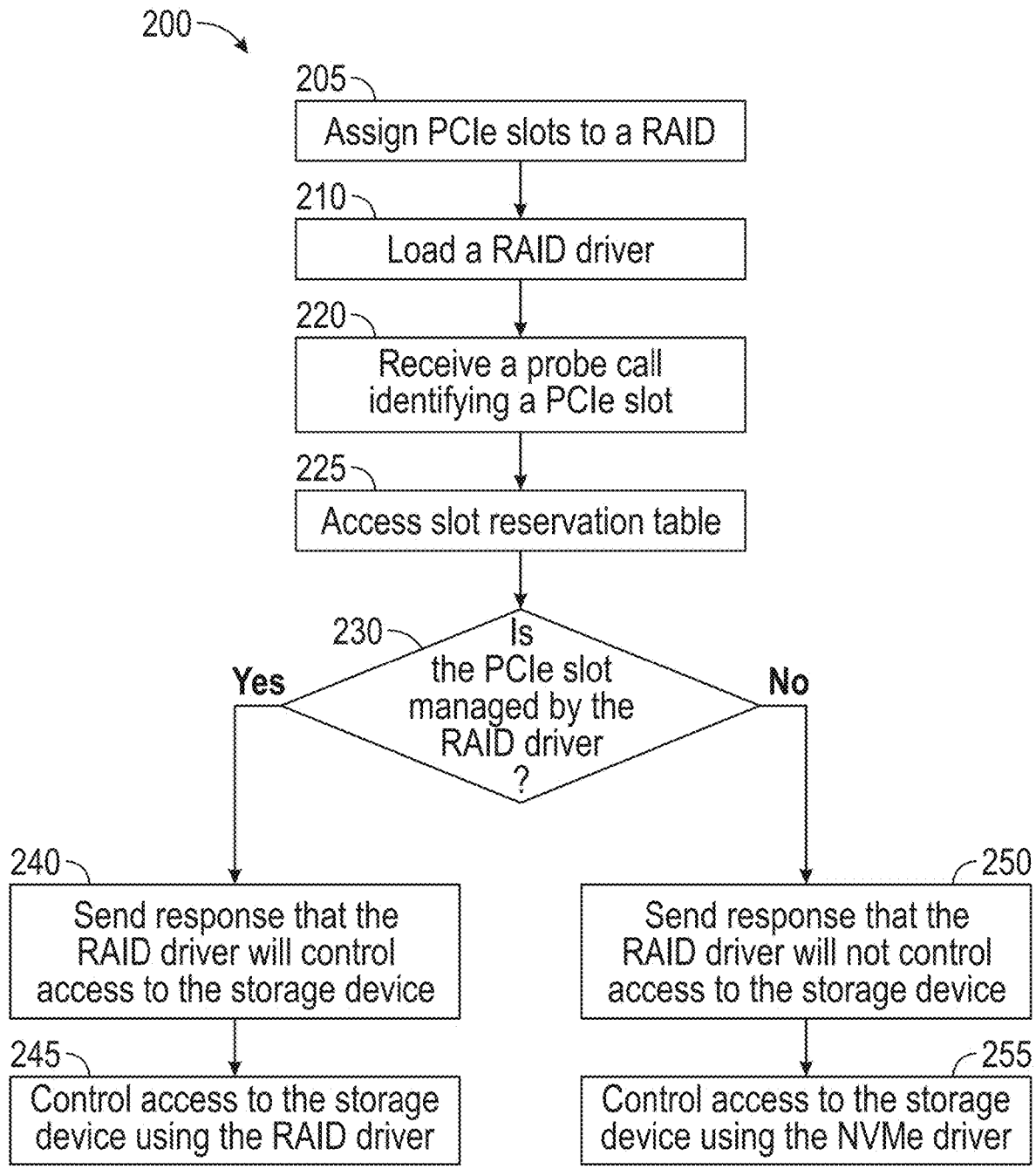
FIG. 2 illustrates a flow chart of the operation of an example system for reserving a PCIe drive slot for management by a RAID driver.

As described in further detail with respect to FIG. 2, when host server 110 boots, host server 110 determines whether a storage device 130 coupled to a PCIe slot 120 is reserved for RAID 150 by accessing slot reservation table 118 stored in memory 114. If a PCIe slot 120 is reserved for RAID 150, a RAID driver controls access to the storage device 130 coupled to the PCIe slot 120 that is reserved for the RAID. The RAID driver may be part of RAID stack 116 used to create RAID arrays. If a PCIe slot 120 is not reserved for RAID 150, the RAID driver does not control access to the storage device 130 to the PCIe slot 120 that is not reserved for RAID 150, and access is instead controlled by another driver (e.g., an NVMe driver native in Linux or Windows operating systems). This allows the RAID driver to control access only to storage devices 130 coupled to reserved PCIe slots 120 such that the RAID driver and the other NVMe driver coexist. This provides the RAID driver exclusive control of storage devices 130 coupled to reserved PCIe slots 120 while allowing storage devices 130a-130n coupled to unreserved PCIe slots 120a-120n to work with another driver in the operating system. For example, when the RAID driver is used to manage certain storage devices 130 in RAID 150, only the logical device (e.g., the RAID volume) is accessible by the operating system. End users are unable to directly access individual storage devices 130 reserved for RAID 150. In contrast, using another driver in the operating system (e.g., MDRAID) allows access to both the logical device and the individual storage devices 130. Such access to the individual storage devices 130 may allow an end user to write to a storage device 130. Writing data to the individual storage devices 130 that are part of RAID 150 may cause data corruption in the logical device.

PCIe slots 120a-120n that are reserved for RAID 150 may be assigned by a manufacturer during the manufacturing process of host server 110 by creating entries in slot reservation table 118. Additionally, or alternately, a user may dynamically change which of PCIe slots 120a-120n are reserved for RAID 150 by editing slot reservation table 118. These changes may be made in the system BIOS (basic input/output system) or using operating system utilities. Because slot reservation table 118 is stored in memory 114, which is non-volatile, the user's changes may persist across reboots of host server 110.

Further, PCIe slots 120a-120n may allow storage devices 130a-130n to be hot plugged during use (i.e., removed or added to device 100 while host server 110 is operating). When a storage device 130 which was part of RAID 150 is swapped, host server 110 must rebuild data lost in RAID 150. When a storage device 130 is swapped, host server 110 determines whether the storage device 130 is coupled to a PCIe slot 120 that is reserved for RAID 150 by sending a probe call to the RAID driver, and the RAID driver responds that it will control access to the storage device 130 when the swapped storage device 130 is coupled to a reserved PCIe slot 120. In some examples, the RAID rebuilding process begins automatically when a storage device 130 is replaced. Reserving PCIe slots 120 for RAID 150 in this manner provides support for operating system installation on RAID 150 by allowing the operating system to be installed across multiple storage devices 120.

FIG. 2 illustrates a flow chart of the operation of an example system for reserving a PCIe drive slot for management by a RAID driver. Method 200 may be stored in memory 114 as machine-readable instructions executed by processor 112 of host server 110, or any other system operable to implement method 200. For example, method 200 may be implemented in a Linux kernel module that is built-in and loads during the boot process or may be a separate module that loads when a device is enumerated. Although examples have been described above, other variations and examples may be made from this disclosure without departing from the spirit and scope of these disclosed examples.

Method 200 begins at block 205 where the processor may assign PCIe slots to the RAID. PCIe slots are assigned to the RAID by creating entries in a slot reservation table stored in host non-volatile random-access memory (NVRAM), such as slot reservation table 118 stored in memory 114 shown in FIG. 1. The entries may be created during the manufacturing process of the host server or created and/or edited by a user accessing the system BIOS or using operating system utilities. The entries in the slot reservation table, because the table is stored in NVRAM, persist across reboots of the processor.

At block 210, the processor may load a RAID driver. The processor may load the RAID driver when booting an operating system and/or when rebuilding the RAID after a storage device that is part of the RAID is hot swapped. The order that the processor loads drivers can be specified in a makefile. The order loadable modules (e.g., Linux kernel modules) are loaded is controlled by the modules.order and modules.alias files in the file system. Specifically, the modules.order file records the order in which modules appear in the makefile and the modules.alias file is used to define additional names to certain modules to make autoloading of a module easier. In one example, the method edits the modules.order file so that the processor loads the RAID driver before another NVMe driver, e.g., the native NVMe driver. Both an NVMe driver in the operating system, which may be a native NVMe driver, and the RAID driver are created as loadable modules. However, because the RAID driver may have a load order higher than an NVMe driver in the operating system in the modules.order and modules.alias files, the RAID driver will be loaded for all NVMe drive enumerations.

At block 220, the RAID driver may receive a probe call identifying a PCIe slot. In some examples, the RAID driver may receive the probe call after the storage device is hot plugged in the PCIe slot. In other examples, the RAID driver may receive the probe call when an operating system is loaded.

At block 225, the RAID driver may access the slot reservation table and then at block 230, the RAID driver may determine whether the identified PCIe slot is managed by the RAID driver. To make this determination, the RAID driver may use the slot reservation table. Specifically, when the RAID driver receives the probe call, it searches the PCIe slot reservation table in the NVRAM. The host server may, during driver initiation of the RAID driver, identify all supported or reserved slots from the PCIe slot reservation table. In some examples, Unified Extensible Firmware Interface (UEFI) runtime services may be used to read configuration information from the PCIe slot reservation table. The PCIe slot reservations may have a predefined structure in the NVRAM including PCIe slot, segment, bus, device, and function of the storage device. The one or more entries in the NVRAM containing the PCIe slot reservations may be created during the manufacturing process or later by a user and may persist after the host server is rebooted. An example of the NVRAM structure is shown in FIG. 4.

If the PCIe slot is managed by the RAID driver (e.g., identified in the slot reservation table), the RAID driver may send a response indicating that the RAID driver will control access to the storage device coupled to the PCIe slot (block 240) and the RAID driver controls access to the storage device (block 245). If the slot is not managed by the RAID driver (e.g., not identified in the slot reservation table), the RAID driver may send a response that it will not control access to the storage device coupled to the PCIe slot (block 250). In this case, at block 255, an NVMe driver in the operating system (e.g., a native NVMe driver) controls access to the storage device coupled to the PCIe slot.

Method 200 may be performed in any operating system environment including Linux, and Windows. Additionally, method 200 may be used with all standard servers and off-the-shelf storage devices. No specific hardware is required. Further, method 200 may be used for preboot (e.g., UEFI) drivers and operating system drivers.

Although FIG. 2 discloses a particular number of operations related to method 200, method 200 may be executed with greater or fewer operations than those depicted in FIG. 2. In addition, although FIG. 2 discloses a certain order of operations to be taken with respect to method 200, the operations comprising method 200 may be completed in any suitable order.

Figure 3:
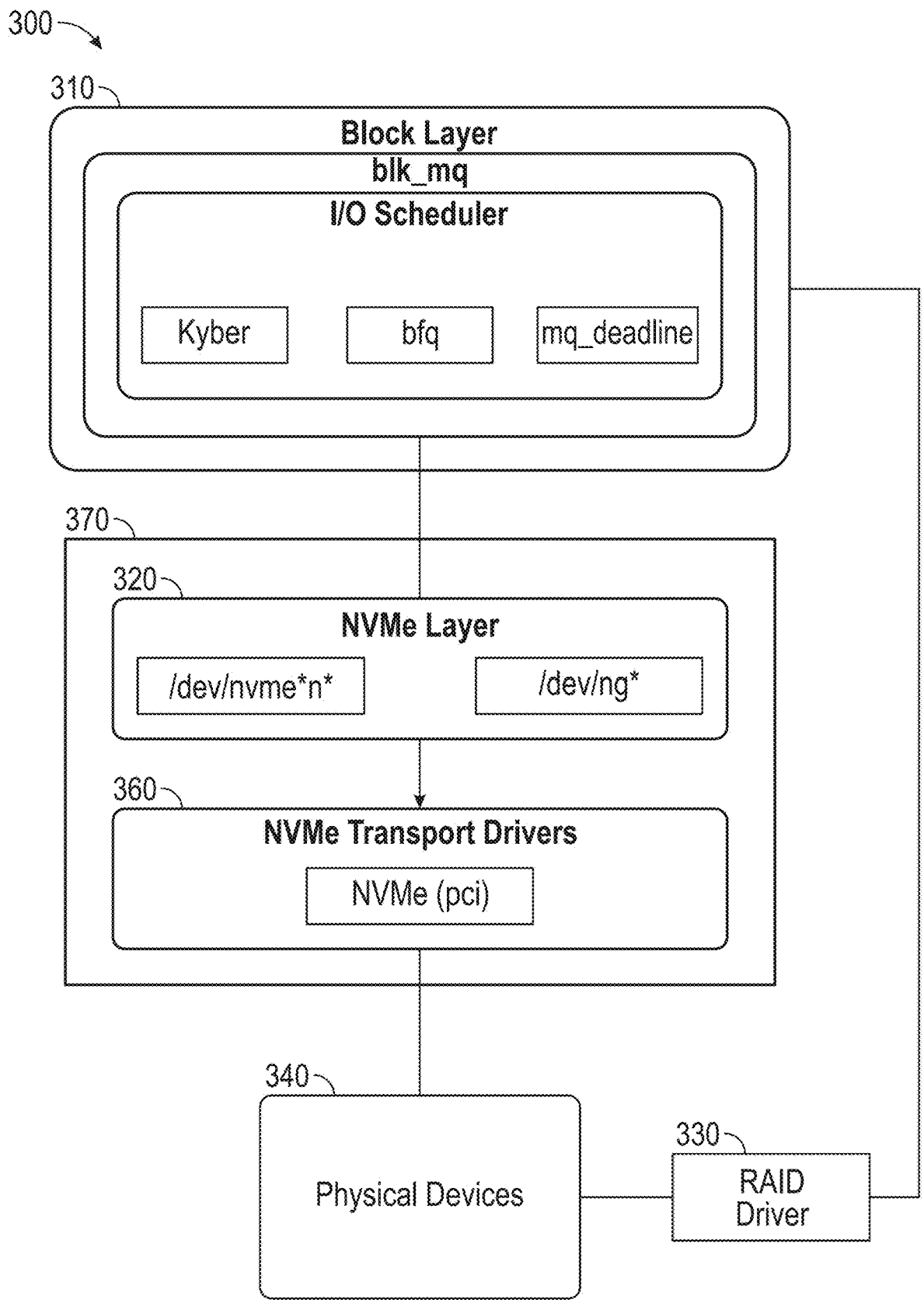
FIG. 3 illustrates a block diagram of an exemplary storage stack including RAID drivers for reserving a PCIe drive slot for management by a RAID driver.

FIG. 3 illustrates a block diagram of an exemplary storage stack for reserving a PCIe drive slot for management by a RAID driver. Storage stack 300 illustrates the communication layers between block layer 310 of storage stack 300 down to physical devices 340. Block layer 310 processes the inputs and outputs (I/O) and is responsible for forwarding application I/O requests to physical devices 340. Between block layer 310 and physical devices 340 is NVMe layer 320 that processes calls to the respective drivers controlling the respective physical devices. RAID driver 330 sits in parallel with an operating system kernel storage stack 370 including NVMe layer 320 and NVMe transport driver 360 of physical devices 340. The operation of RAID driver 330 and NVMe driver 360, which as indicated above may be a native PCIe driver, is explained in more detail with respect to FIG. 2.

FIG. 4 illustrates an example structure for an NVRAM slot reservation table. Structure 400 identifies the supported or reserved PCIe slots. Structure 400 is predefined and includes PCIe slot, segment, bus, device, and function of the storage device. The one or more entries in the NVRAM slot reservation table, such as slot reservation table 118 shown in FIG. 1, containing the PCIe slot reservations may be created during the manufacturing process of a host server or later by a user.

Although examples have been described above, other variations and examples may be made from this disclosure without departing from the spirit and scope of these examples.

The invention claimed is:

1. A system comprising:
   a peripheral component interconnect express (PCIe) slot;
   a storage device coupled to the PCIe slot; and
   a host server coupled to the PCIe slot, the host server including a processor and a non-transitory memory including machine-readable instructions that, when executed by the processor, cause the processor to:
      load a first redundant array of independent disks (RAID) driver in a RAID stack of the host server;

receive, by the first RAID driver in the RAID stack, a probe call identifying the PCIe slot;

determine, based on an entry in a slot reservation table stored in a non-volatile RAM accessible by the first RAID driver, whether the storage device coupled to the PCIe slot is managed by either the first RAID driver or a second RAID driver in the RAID stack;

send, when the PCIe slot is identified in the entry in the slot reservation table, a response to the storage device stating that the first RAID driver controls access to the storage device coupled to the PCIe slot; and send, when the PCIe slot is not identified in the entry in the slot reservation table, a response to the storage device stating that the second RAID driver controls access to the storage device; and wherein the first RAID driver has a load order higher than the second RAID driver and the second RAID driver is an NVMe driver.

2. The system of claim 1, wherein when the PCIe slot is identified in the slot reservation table, the first RAID driver controls access to the storage device coupled to the PCIe slot.

3. The system of claim 1, wherein receiving the probe call occurs after a hot plug operation.

4. The system of claim 1, wherein receiving the probe call occurs when an operating system is loaded.

5. The system of claim 1, wherein the slot reservation table persists after the host server is rebooted.

6. The system of claim 1, wherein the first RAID driver is parallel to an NVMe layer in an operating system kernel storage stack.

7. The system of claim 1, wherein the storage device is a solid state drive.

8. The system of claim 1, wherein the storage device is a hard disk drive.

9. A method comprising:
loading a first redundant array of independent disks (RAID) driver in a RAID stack of a host server;
receiving, by first the RAID driver in the RAID stack, a probe call identifying a peripheral component interconnect express (PCIe) slot;
determining, based on an entry in a slot reservation table stored in a non-volatile RAM accessible by the first RAID driver, whether a storage device coupled to the PCIe slot is managed by either the first RAID driver or a second RAID driver in the RAID stack;
sending, when the PCIe slot is identified in the entry in the slot reservation table, a response to the storage device stating that the first RAID driver controls access to the storage device coupled to the PCIe slot; and
sending, when the PCIe slot is not identified in the entry in the slot reservation table, a response to the storage device stating that the second RAID driver controls access to the storage device; and wherein the first RAID driver has a load order higher than the second RAID driver and the second RAID driver is an NVMe driver.

10. The method of claim 9, wherein when the PCIe slot is identified in the slot reservation table, the first RAID driver controls access to the storage device coupled to the PCIe slot.

11. The method of claim 9, wherein receiving the probe call occurs after a hot plug operation.

12. The method of claim 9, wherein receiving the probe call occurs while a host server operating system is loaded.

13. The method of claim 9, wherein the slot reservation table persists after a reboot.

14. An article of manufacture comprising:
a non-transitory memory including machine-readable instructions that, when executed by a processor, cause the processor to:
load a first redundant array of independent disks (RAID) driver in a RAID stack of the host server;
receive, by the first RAID driver in the RAID stack, a probe call identifying the PCIe slot;
determine, based on an entry in a slot reservation table stored in a non-volatile RAM accessible by the first RAID driver, whether the storage device coupled to the PCIe slot is managed by either the first RAID driver or a second RAID driver in the RAID stack;
send, when the PCIe slot is identified in the entry in the slot reservation table, a response to the storage device stating that the first RAID driver controls access to the storage device coupled to the PCIe slot; and
send, when the PCIe slot is not identified the entry in in the slot reservation table, a response to the storage device stating that the second RAID driver controls access to the storage device; and
wherein the first RAID driver has a load order higher than the second RAID driver and the second RAID driver is an NVMe driver.

15. The article of manufacture of claim 14, wherein when the PCIe slot is identified in the slot reservation table, the first RAID driver controls access to the storage device coupled to the PCIe slot.

16. The article of manufacture of claim 14, wherein the instructions have a load order higher than an NVMe driver.

17. The article of manufacture of claim 14, wherein the slot reservation table persists after a reboot.

18. The system of claim 1, wherein the NVMe driver is a driver native in an operating system of the host server.

19. The method of claim 9, wherein the first RAID driver is parallel to an NVMe layer in an operating system kernel storage stack.

20. The article of manufacture of claim 14, wherein the first RAID driver is parallel to an NVMe layer in an operating system kernel storage stack.

* * * * *